United States Patent [19]

Imamoto

[11] 4,310,844

[45] Jan. 12, 1982

[54] METHOD AND APPARATUS FOR DETECTING THE WORKING STATE OF A PRINTING PRESS OR THE LIKE

[75] Inventor: Tsunehiko Imamoto, Yokohama, Japan

[73] Assignee: Dai Nippon Insatsu Kabushiki Kaisha, Tokyo, Japan

[21] Appl. No.: 138,925

[22] Filed: Apr. 10, 1980

[30] Foreign Application Priority Data

Apr. 14, 1979 [JP] Japan .................................. 54-45755

[51] Int. Cl.³ ................................................ G01D 9/00

[52] U.S. Cl. ................................ 346/1.1; 346/33 MC

[58] Field of Search .................... 346/33 R, 33 MC, 1, 346/140 A

[56] References Cited

U.S. PATENT DOCUMENTS 3,125,401 3/1964 Boone ............................ 364/140 A
3,359,561 12/1967 Shostek ......................... 346/33 R X
3,478,202 11/1969 Snodgrass ..................... 346/33 R X
3,742,514 6/1973 Sugimura ........................... 346/33 R
3,950,759 4/1976 Ziegenfuss ......................... 346/33 R

*Primary Examiner*—George H. Miller, Jr.
*Attorney, Agent, or Firm*—Koda and Androlia

[57] ABSTRACT

A method of detecting the lengths of normal operation time and downtime, and at least approximate causes for downtime, of a printing press during each preassigned period of production time. During the progress of each production period there are derived from the printing press its electrical control signals which are indicative of the printing operation and at least approximate downtime causes. The control signals are sequentially recorded in the form of corresponding, visually identifiable marks. A visual examination of the marking provides the desired data. There is also disclosed herein a recorder of typical construction for recording the signals in the practice of the inventive method.

8 Claims, 12 Drawing Figures

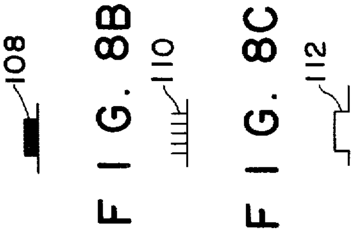
FIG. 8A
FIG. 8B
FIG. 8C
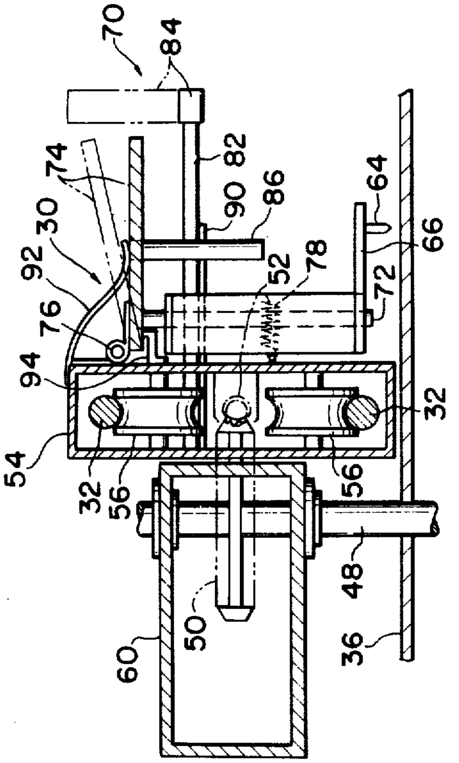
FIG. 5
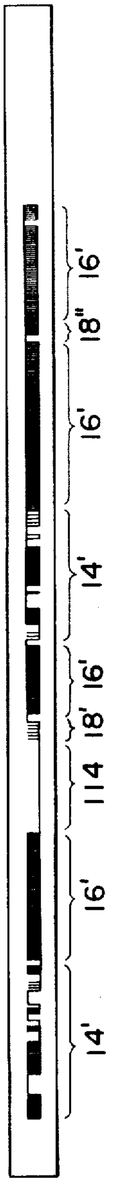
FIG. 6

FIG. 7
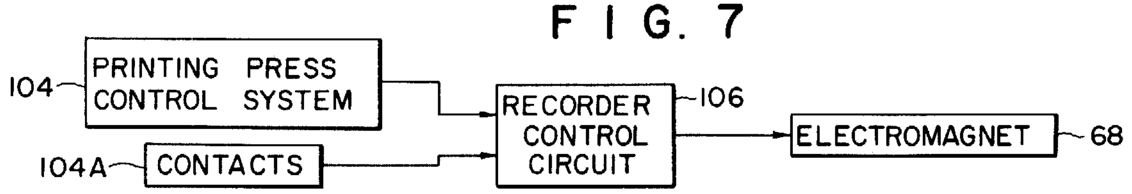
FIG. 9
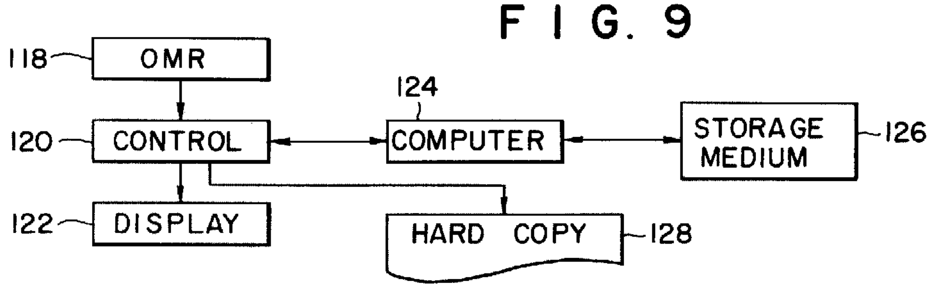
FIG. 10
| SUMMATION TABLE | | | | | | | | |
|---|---|---|---|---|---|---|---|---|
| PRODUCTION VOLUME | | PRODUCTION TIME | | | | | EFFICIENCY | |
| NO. SHEETS | NO. ROLLS | OPERA-TION | CONVER-SION | OTHER | INTER-RUPTION | TOTAL | OPERATION EFFICIENCY | % OPERATION |
| 8500 | | 6.7 | 3.7 | 0.6 | | 11.0 | 1268.7 | 60.9 |
| | | | | | | | | |
| | | | | | | | | |

METHOD AND APPARATUS FOR DETECTING THE WORKING STATE OF A PRINTING PRESS OR THE LIKE

BACKGROUND OF THE INVENTION

This invention belongs to the broad realm of production engineering or production management and deals more specifically with a novel method of automatically ascertaining the working state of a machine or apparatus with a view to higher production efficiency per unit time. The invention is also specifically directed to means for use with the inventive method.

The method and means according to the invention have been developed for, and actually find optimum application to, printing presses; nevertheless, they lend themselves to ready adaptation for a variety of other machines or apparatus such as, for example, electronic platemaking machines and bookbinding machines. With this adaptability understood, the invention will be disclosed herein only in association with printing presses.

Any machine has downtime. A knowledge of its exact lengths and causes is a prerequisite for the development of effective remedies and hence for an increase in the production of the machine per unit time. In the printing industry, for example, a pressman in charge of each printing press has heretofore made it his duty to fill in a form, called a presswork sheet (shown in FIG. 1 of the attached drawings), with pertinent data representative of the working condition of the press. The data during each given period of time are compiled and put to analytical study of the working state of the printing press.

Given below by way of example is a list of items to be checked upon by the pressman in filling in the presswork sheet:

I. Volume of production (the number of printed sheets or rolls)

II. Production time (the time during which the printing press is scheduled to be, but actually may or may not be, in operation).

- A. Operation time (the time during which the press is in normal printing operation).
- B. Downtime (lost production time).
  - 1. Preparation time
    - a. Conversion of printing plates or cylinders.
    - b. Other causes.
  - 2. Interruption time.
    - a. Upkeep of the printing plate or cylinder.
    - b. Repairs of the press.
    - c. Other causes.

The "other causes" for "preparation time", one of the two divisions of "downtime", may include such a diversity of preparatory operations as the changing of dampening rollers, inking rollers, blankets, etc., and the washing of the blanket cylinder, inking rollers, etc. The "other causes" for "interruption time", the other division of "downtime", may include such incidental impediments as the out-of-stock of printing paper, the non-arrival of data or other material to be printed, and cleaning. Further, the "upkeep of the printing plate or cylinder", classified as one of the causes for "interruption time", may be subdivided into the removal of smudges or smears, the repair of damage, etc. Each of the other listed items likewise resolves itself into a plurality of factors.

It is therefore no easy task for a pressman to check on all these items and record the required data on the presswork sheet. (A manner of filling in the presswork sheet will be detailed later with reference to FIG. 1.) He may fail to record all the required data or may record inaccurately, making impossible the proper assessment of the working state of the printing press.

As additional duty hitherto imposed on the pressman has been to calculate the lengths of the above enumerated division and subdivisions of "production time", during each preassigned length of such time, and to record the results on the presswork sheet. This practice is also objectionable in view of unavoidable miscalculations and the possible failure by the pressman to fill in all the necessary blanks.

SUMMARY OF THE INVENTION

The present invention seeks to automate or mechanize, as far as possible, the detection of the working state of a machine or apparatus whose production time is comprised of operation time and downtime, with the downtime being liable to occur for a plurality of known causes. More specifically, according to the method of the invention, there are first derived from the machine, during the progress of its production time, signals suggestive of the operation and at least approximate downtime causes of the machine. The signals are sequentially or continuously recorded on a suitable record medium so as to permit easy visual identification of each signal.

Thus the operation time, downtime, and at least approximate downtime causes of the machine can be ascertained upon inspection of the recorded signals or marks on the record medium. A pressman in charge of each printing press, for example, may therefore fill in the presswork sheet by referring to the recording. The data thus transcribed on the presswork sheet will be far more reliable than such data recorded in accordance with the conventional practice.

According to another aspect of the invention the recording on the record medium, or its transcription on a form such as the presswork sheet, is then encoded into a machine language by a suitable pattern recognition system. The encoded data are input to and processed in a computer to obtain information such as the lengths of operation time and downtime in numerical values. Being free from any errors, such information enables accurate assessment of the working state of the machine.

The invention also provides a recorder for use in the practice of the invention method, that is, for recording or marking the signals derived from the machine during its production time. The recorder records the signals with a set of corresponding marks designed for rapid comprehension and interpretation of the recording.

The above and other features and advantages of this invention will become more apparent and understandable from a study of the following detailed description, in which reference is directed to the attached drawings.

BRIEF DESCRIPTION OF THE DRAWINGS

FIG. 5 is a vertical sectional view taken along the line V—V of FIG. 4;

FIG. 6 shows a record tape for use with the recorder of FIG. 2, the record tape being shown together with an example of recording or marking made by the recorder to represent the working state of the printing press;

FIG. 7 is a block diagram explanatory of means for deriving the desired control signals from the printing press and controlling the operation of the recorder;

FIGS. 8A, 8B and 8C show examples of marks, to be inscribed on the record tape of FIG. 6 by the recorder of FIG. 2, corresponding to the respective control signals derived from the printing press;

FIG. 9 is a block diagram of means for processing the data on the presswork sheet of FIG. 1 and obtaining desired information; and FIG. 10 shows an example of a form (hard copy) on which information put out by the means of FIG. 9 is recorded.

DETAILED DESCRIPTION OF THE INVENTION

Figure 1:
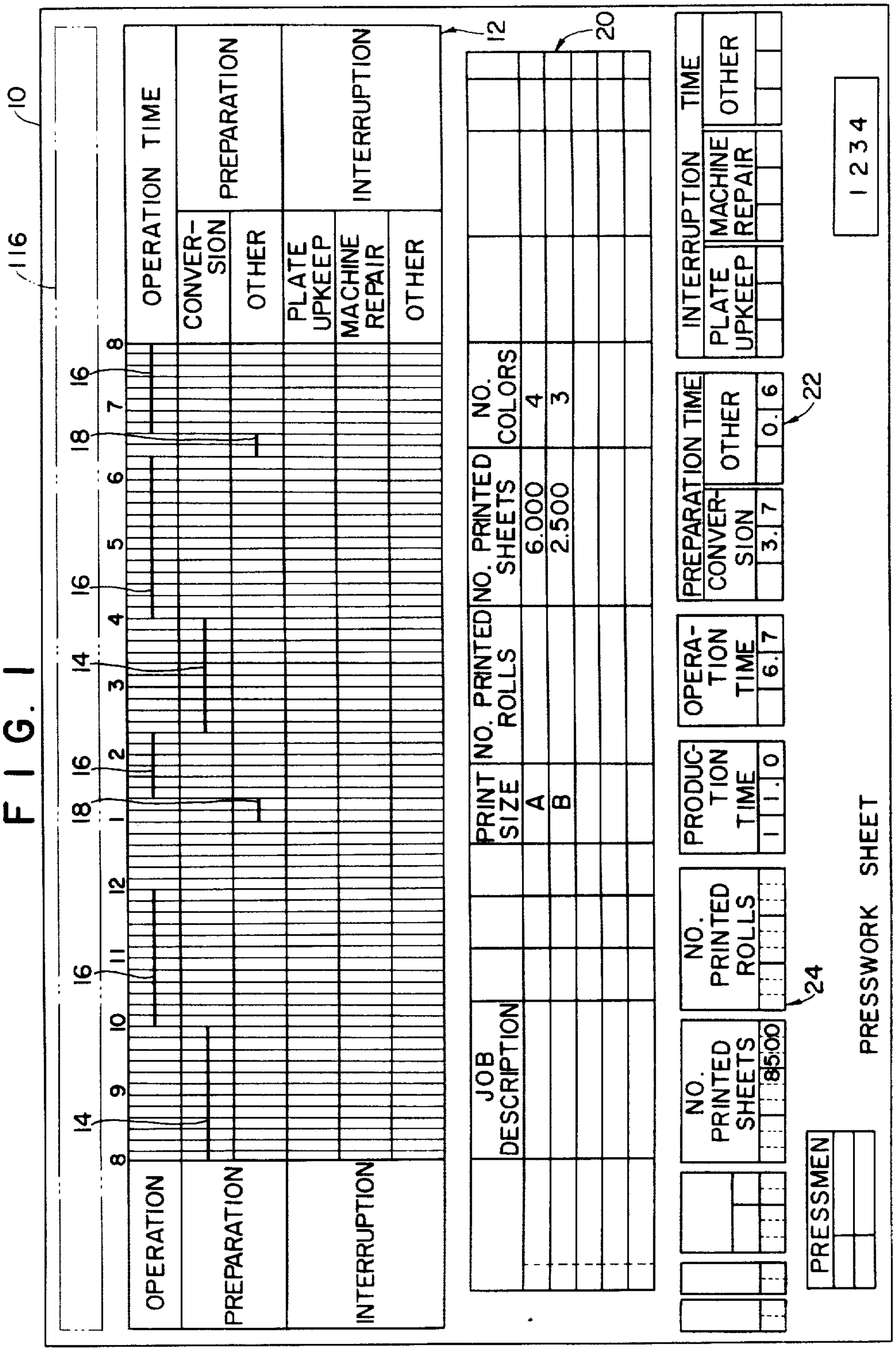
FIG. 1 shows a typical presswork sheet for presentation of data useful for the assessment of the working state of a printing press, the presswork sheet having been used heretofore and being also intended for use in the practice of the method according to this invention.

Reference is first directed to the presswork sheet 10 of FIG. 1 in order to describe, in some more detail, the conventional method of filling in the sheet. The presswork sheet 10 includes a production time chart 12 for presentation of the details of presswork during each preassigned length of production time (as defined previously). The preassigned production period may be 12 hours, for example, lasting from eight o'clock, either in the morning or afternoon, to eight o'clock in the following afternoon or morning.

Let it be assumed that two hours of preparation have been expended for plate conversion before commencement of actual printing operation in one production period. Then the pressman in charge of the printing press draws a line 14 from "8" to "10" in the production time chart blank labeled "CONVERSION". If a first run of printing operation has started at 10:00 and ended at 12:00, the pressman draws a line 16 from "10" to "12" in the "OPERATION" blank. If another period of preparation has been necessary from 1:00 to 1:20 for a cause other than plate conversion, the pressman draws a line 18 in the pertinent part of the "OTHER" blank of "PREPARATION". He likewise proceeds to draw additional lines 14, 16 and 18 in the required blanks as the production time progresses.

The presswork sheet 10 also contains a set of blanks 20 with headings such as "JOB DESCRIPTION", "PRINT SIZE", "NO. PAINTED ROLLS", "NO. PRINTED SHEETS", and "NO. COLORS". The pressman is required to fill in these blanks during or at the end of his assigned production period.

Further, at the end of the assigned production period, the pressman must compute the total lengths of the operation time, the conversion and other preparation times, etc., from the lines 14, 16 and 18 which he drew in the production time chart 12. The results of the computation are written in the blanks shown at 22. The pressman must also record the total volume of production during his assigned production period in either or both of the two blanks designated 24.

The above conventional practice has much room for errors to creep in. The present invention makes possible the assessment of the working conditions of printing presses or the like with a much higher degree of accuracy. The method according to the invention necessitates the use of a recorder of various possible configurations, such as the one shown in FIGS. 2 through 5. It will redound to an easier understanding of the invention to first describe the illustrated recorder and then to proceed to the discussion of the inventive method in connection with the recorder.

Figure 2:
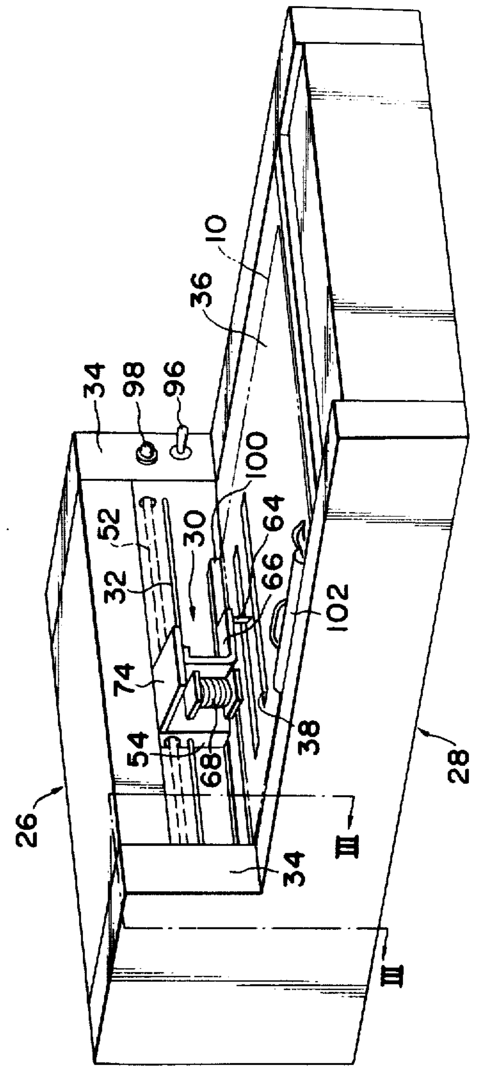
FIG. 2 is a perspective view of a typical recorder suitable for use in recording the electrical control signals derived from a printing press for detecting its working state in accordance with the invention method.

With particular reference to FIG. 2, the recorder 26 includes a frame or casing 28. A recording head 30 is reciprocally movable along a pair of guide rails 32 (one seen in FIG. 2) extending horizontally between the opposed side walls 34 of the casing 28. This casing integrally includes a table 36 on which a record medium such as a definite length of paper tape 38 is to be placed. Alternatively, the record medium may be an integral part of the presswork sheet 10 shown in FIG. 1, as will be later explained in more detail.

Figure 3:
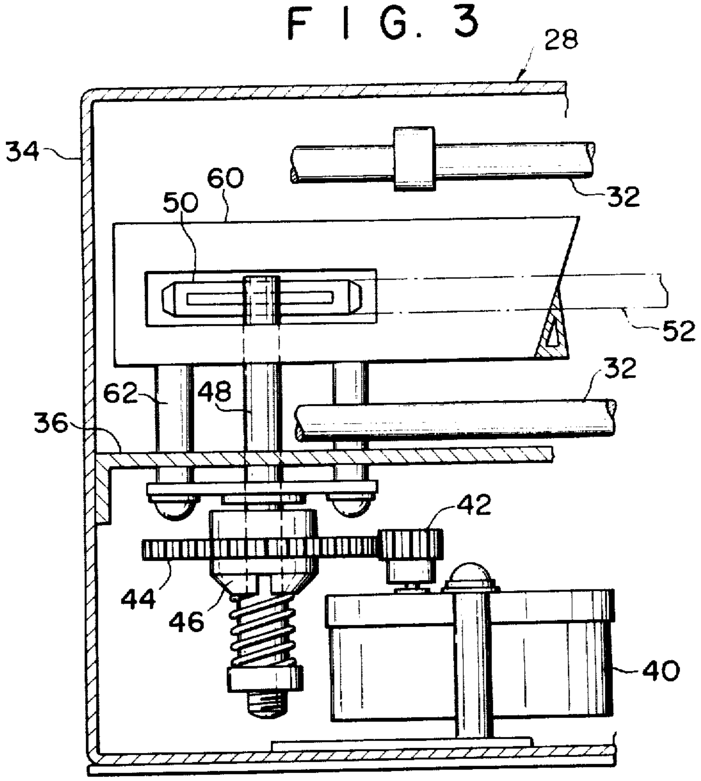
FIG. 3 is an enlarged, partial, vertical sectional view of the recorder, taken along the plane indicated at III—III in FIG. 2.
Figure 4:
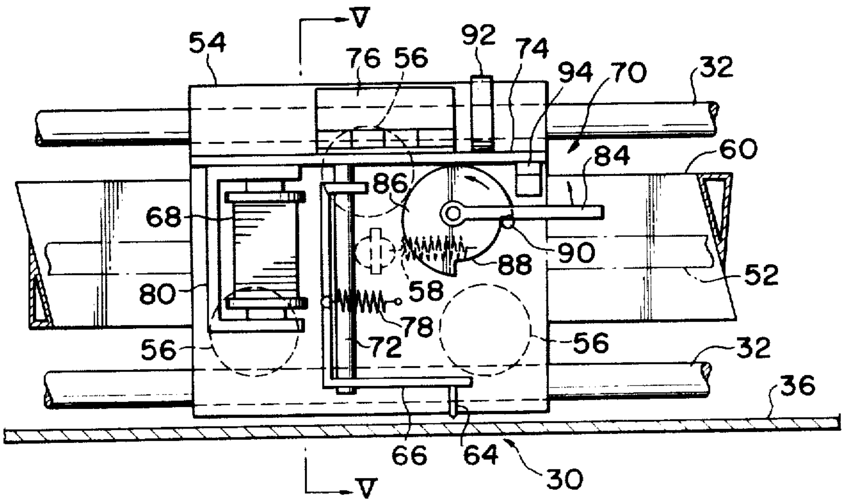
FIG. 4 is an enlarged, front elevational view of the recording head and associated parts in the recorder of FIG. 2.

FIGS. 3, 4 and 5 reveal the drive mechanism for reciprocating the recording head 30 along the guide rail pair 32. The drive mechanism includes a bidirectional motor drive unit 40 (FIG. 3) coupled to a drive pinion 42 in mesh with a driven gear 44. The driven gear 44 is mounted via a clutch 46 on an upstanding, rotatable shaft 48 on which a drive sprocket 50 is fixedly mounted. Anchored at both ends to the recording head 30 in a manner yet to be described, a drive chain 52 extends around the drive sprocket 50 and an idler sprocket (not shown) in parallel relation to the guide rail pair 32.

Thus, with the bidirectional rotation of the motor drive unit 40, the recording head 30 travels back and forth along the guide rail pair 32. The drive sprocket 50 will experience excessive torque when the recording head 30 reaches either end of its stroke, with the motor drive unit 40 in continuous rotation. Thereupon the clutch 46 functions to discontinue torque transmission from the driven gear 44 to the shaft 48.

As seen in both FIGS. 4 and 5, the recording head 30 is mounted on a box-like carriage 54 having three wheels or rollers 56 rotatably supported therein. The upper one of the three wheels 56 is in rolling engagement with the upper guide rail 32, whereas the other two wheels are both in rolling engagement with the lower guide rail 32. The opposite ends of the drive chain 52 extend into the recording head carriage 54 and are connected to a suitable part therein via tension springs 58. Thus the recording head 30 with its carriage 54 rolls along the guide rail pair 32 upon rotation of the motor drive unit 40. The rear span of the drive chain 52, extending on the back of the recording head carriage 54, is housed in an enclosure 60 mounted on the table 36 via columns 62.

The recording head 30 comprises a recording stylus 64 rigidly affixed to a pivotable, L-shaped stylus carrier 66 of magnetizable material, an electromagnet 68 for actuating the recording stylus via its carrier, and a stylus lift mechanism 70 for manually raising the recording stylus away from the record tape 38 or from the table 36 as required. The record tape 38 for use in this particular embodiment is assumed to be of the known scratch type. Held in marking contact with the scratch-type record tape 38, the recording stylus 64 creates a recording thereon, such as that shown in FIG. 6 by scratching the tape on being oscillated in its transverse direction by the electromagnet 68 while being fed longitudinally at constant speed by the drive chain 52.

The stylus carrier 66 is pivotally mounted on a pivot pin 72 extending downwardly from a pivotable bracket 74. This bracket is hinged at 76 to the recording head carriage 54 for pivotal movement about a horizontal axis. When the bracket 74 is in the illustrated normal position, the recording stylus 64 on the stylus carrier 66 oscillates about the vertical axis of the pivot pin 72. A coiled tension spring 78 extends between the recording head carriage 54 and the stylus carrier 66 for biasing the recording stylus 64 toward the recording head carriage.

Disposed opposite to the stylus carrier 66, the electromagnet 68 is fixedly mounted on the recording head carriage 54 via a yoke 80. Thus, upon energization of the electromagnet 68, the magnetic stylus carrier 66 is thereby attracted and pivoted about the pivot pin 72 against the bias of the tension spring 78. The energization and de-energization of the electromagnet 68 result in the oscillations of the recording stylus 64 in the transverse direction of the record tape 38, with the stylus scratching the record tape to make a recording thereon.

The stylus life mechanism 70, which is to be actuated only at the start and end of each recording period, includes a rotatable shaft 82 extending forwardly and horizontally from the recording head carriage 54. The shaft 82 terminates in a manual lift lever 84. A cam disc 86 is fixedly mounted on the shaft 82 in sliding contact with the pivotable bracket 74. The cam disc 86 has formed therein an arcuate recess 88 centered at the axis of the shaft 82, and a stop pin 90 on the recording head carriage 54 is slidably engaged in the arcuate recess 88 for limiting the angle of rotation of the cam disc 86. A cantilever spring 92 on the recording head carriage 54 biases the pivotable bracket 74 downwardly. Shown at 94 is a safety stop formed on the recording head carriage 54 for limiting the descent of the pivotable bracket 74.

FIG. 4 shows the manual lift lever 84 in its normal or horizontal position, with the recording stylus 64 lowered into marking contact with the record tape 38 on the table 36. Upon counterclockwise turn of the manual lift lever 84 to the phantom position depicted in FIG. 5, the cam disc 86 raises the pivotable bracket 74 against the bias of the cantilever spring 92. The recording stylus 64 is thus lifted away from the record tape 38 or from the table 36.

It is to be understood that the illustrated recording head 30 represents but one of various possible types adaptable for use in the recorder 26. For example, the recording head of a dot printer, or that of a pen recorder, may be substituted for the recording head 30. Such alternative recording heads dictate, of course, the use of matching record media in lieu of the scratch-type paper tape 38.

With reference back to FIG. 2 the recorder 26 is further shown to comprise a power switch 96 and a pilot lamp 98, the latter being lit upon closure of the power switch. An abutment 100 is formed at the rear end of the table 36 for use in placing the presswork sheet 10 in position on the table. A spring clip or clamp 102 is mounted on one side of the table 36 for holding the presswork sheet 10 against displacement during recording operation.

The following is the description of the method according to the invention. As has been pointed out, the production time of a printing press inevitably includes downtime, in addition to operation time. Not only the exact lengths of such operation time and downtime but also the causes for downtime must be determined and analyzed in order to derive maximum possible production from the machine. The downtime of a printing press is bound to occur for a variety of known causes such as plate conversion, plate upkeep, machine repair, etc. The inventive method has originated from the discovery that a fairly accurate detection of the listed downtime causes, and the discrimination between the aforesaid "preparation" and "interruption" times, are possible by taking advantage of electrical signals derived from the control system of the machine.

The control system of an electrically controlled printing press usually has:

1. An "operation" switch for setting the machine in motion at normal speed for printing operation.

2. A "low" switch for setting the cylinders in continuous, low-speed rotation.

3. An "inching" switch for setting the cylinders in temporary low-speed rotation.

4. A "stop" switch for stopping the machine.

Normal printing operation requires the closure of only the "operation" switch. Plate conversion demands the actuation of both "low" and "inching" switches, for slowly revolving the plate/cylinder, both continuously and intermittently. The washing of the blanket cylinder, one of the "other" causes for "preparation" time, necessitates the actuation of only the "low" switch. The discrimination between operation time and downtime, as well as the detection of at least approximate downtime causes, can be accomplished by sequentially recording, throughout the course of each production period, the signals generated upon actuation of the respective control switches.

FIG. 7 is explanatory of the manner of utilizing the printing press control signals for the purposes of this invention. Derived from the printing press control system 104, the control signals are fed into a recorder control circuit 106, which is electrically connected to the electromagnet 68 of the recording head 30 for energizing same. It is also possible to derive the control signals from various contacts 104A of the printing press itself. The recorder control circuit 106 variously energizes the electromagnet 68 to cause the recording stylus 64 to record the successively incoming control signals on the record tape 38 in the form of corresponding marks. These marks should permit easy visual identification of the corresponding control signals.

FIGS. 8A, 8B and 8C represent examples of such marks. The mark 108 of FIG. 8A corresponds to the control signal generated upon closure of the "operation" switch. The mark 110 of FIG. 8B corresponds to the signal generated upon closure of the "inching" switch. The mark 112 of FIG. 8C corresponds to the signal generated upon closure of the "low" switch. These marks 108, 110 and 112 must be physically different from each other, in such respects as shape, dimension and area, and each should allow ready visual recognition as such.

It is thus seen that during the progress of each production period, the recorder 26 records the successive control signals in the form of the corresponding marks 108, 110 and 112 to represent printing operation, plate conversion, blanket cylinder wash, etc. The recordings of plate conversion, blanket cylinder wash, and other downtime causes may be alike, depending upon the manner of execution of each job. However, the pressman in charge of the printing press should be able to interpret each such recording from the context.

In order to make clear the manner in which the recorder 26 marks the incoming control signals, the marking on the record tape 38 of FIG. 6 has been plotted in conformity with the manual recording by the pressman on the production time chart 12 of the presswork sheet 10 of FIG. 1. The portions 14' of the marking on the record tape 38 contain in mixture the marks representative of the "low" and "inching" control signals. Thus the marking portions 14' represent preparation time due to plate conversion. The portions 16' of the marking contain the mark representative of the "operation" control signal and so correspond to operation time.

The portion 18' of the marking on the record tape 38 is comprised of the mark representative of the "inching" control signal. Thus the marking portion 18' can be interpreted to suggest preparation time due to the washing of the impression cylinder. The portion 18" of the tape marking includes the mark repesentative of the "low" control signal. This marking portion 18" suggests, therefore, preparation time due to the washing of the blanket cylinder. The portion 114 of the tape marking denotes the nonproduction of the machine, with the "stop" switch turned on.

Perhaps aided by his own memory, the pressman deciphers the marking on the record tape 38 as in the foregoing and transcribes the marking on the production time chart 12 of the presswork sheet 10. He is also required, as he has been heretofore, to fill in the blanks under the titles of "JOB DESCRIPTION", "PRINT SIZE", "NO. PRINTED ROLLS" (in the case of a web-fed press) or "NO. PRINTED SHEETS" (in the case of a sheet-fed press), and "NO. COLORS".

The record medium on which the printing press control signals are marked by the recorder 26 may be either an entity, like the tape 38, separate from the presswork sheet 10 or an integral part of the presswork sheet. If the record medium takes the form of the tape 38, only this tape is to be placed on the recorder table 36 for marking. The marked tape 38 may then be pasted or otherwise attached to the presswork sheet 10, as in the vicinity of its production time chart 12 for the ease of transcription.

Preferably, however, the control signals should be recorded directly on the presswork sheet 10, as in its blank 116 just over the production time chart 12. The table 36 of the illustrated recorder 26 is designed to accommodate the presswork sheet 10, as indicated by the broken lines in FIG. 2. The presswork sheet is to be placed on the recorder table 36, with its top edge in neat contact with the abutment 100, and retained in position thereon by the clip or clamp 102. The recording head 30 will then travel over the blank 116 of the presswork sheet 10 to mark thereon in response to the incoming control signals.

It is to be appreciated that the recorder 26 creates a linear recording of the control signals, either on the presswork sheet blank 116 or on the separate record tape 38. Such a linear recording is easy to transcribe on the production time chart 12, which also makes linear representation of the working state of the machine.

The method of this invention may or does involve the additional step of encoding into a machine language the data transcription on the production time chart 12 and, if desired, the manually inscribed data on the blanks 20. This step cells for the use of a known or suitable pattern recognition system, such as those based on optical character recognition (OCR) or optical mark reading (OMR) schemes, for scanning the pertinent part or parts of the presswork sheet 10. The encoded data are processed, as hereinafter described with reference to FIG. 9, to obtain desired information.

The typical system for processing the data on the presswork sheet 10 comprises an OMR reader section 118, control section 120, display 122 (e.g., a cathode ray tube), electronic computer 124, storage medium 126, and hard copy 128, which are interrelated as shown. The optical mark reader inputs the encoded data to the computer 124. This computer computes the lengths of operation time and the various divisions of downtime, etc., and puts out the information on the hard copy 128. The presswork sheet 10 may itself serve as the hard copy 128, with the computer output produced on its blanks 22. Alternatively the computer output may be produced on a separate form such as the one shown in FIG. 10. Called a summation table, the form of FIG. 10 is intended to list information obtained from successive periods of production time.

If desired, the recording or marking on the record tape 38 or on the presswork sheet blank 26 may be directly translated into machine code by means of a suitable pattern recognition system. In this case the computer will put out only such information as the lengths of operation time and downtime.

What is claimed is:

1. A method of detecting the working state of a machine whose production time includes both operation time and downtime, the downtime being due to a plurality of possible causes, which method comprises:

placing on a recorder table a record medium in the form of a flat sheet having a set of blanks to be filled in to record the working state of the machine as well as an elongated signal recording blank;

providing a recording head having a recording member;

moving the recording head relative to the signal recording blank along the length thereof;

deriving from the machine, during the progress of its production time, successive electrical signals indicative of the operation and at least approximate downtime causes of the machine; and sending the successive signals to the recording head to move the recording member, as it is moved along the length of the recording blank, transversely to the length of the recording blank with different time intervals to record the signals in the recording blank along the length thereof with visually different shapes and dimensions, respectively, the recorded signals comprising essentially segments of line spaced apart differently lengthwise of the recording blank depending upon different signals; whereby the operation time, downtime, and at least approximate downtime causes of the machine can be visually ascertained from the recording in the recording blank of the sheet and the recording can be readily transcribed in the set of blanks.

2. The method according to claim 1, which further comprises:

(a) encoding the recording on the record medium into a machine language; and (b) processing the encoded recording in a computer to obtain desired information.

3. The method according to claim 1 wherein the computer produces the desired information on a summation table for listing such information of successive preassigned periods of production time.

4. The method according to claim 1, further comprising:

transcribing the recording of the recording blank in the other blanks;

encoding the transcription in the blanks into a machine language; and processing the encoded transcription in a computer to obtain desired information.

5. A method of detecting the working state of an electrically controlled printing press or like machine whose production time includes both operation time and downtime, the downtime being due to a plurality of possible causes, which method comprises:

placing on a recorder table a record medium in the form of a flat sheet having a set of blanks to be filled in to record the working state of the printing press as well as an elongated signal recording blank;

providing a recording head having a recording member;

moving the recording head relative to the signal recording blank along the length thereof;

deriving from the press, during the progress of its production time, a sequence of electrical control signals controlling the operation of the press, the control signals including an "operation" signal for operating the press at normal speed, a "low" signal for continuously operating the press at low speed, and an "inching" signal for temporarily operating the press at low speed; and sending the successive signals to the recording head to move the recording member, as it is moved along the length of the recording blank, transversely to the length of the recording blank with different time intervals to record the signals in the recording blank along the length thereof with visually different shapes and dimensions, respectively, the recorded signals comprising essentially segments of line spaced apart differently lengthwise of the recording blank depending upon different signals;

whereby the operation time, downtime, and at least approximate downtime causes of the press can be determined upon visual inspection of the recording in the recording blank of the sheet and the recording can be readily transcribed in the set of blanks.

6. The method according to claim 5, wherein the distances of the segments of line are fine for the "operation" signal, medium for the "inching" signal, and rough for the "low" signal.

7. A recorder for recording the signals on the record medium in the method of claim 1 or 5, the recorder comprising:

a casing having a table on which the record medium is to be placed;

guide means on the casing;

a recording head movable along the guide means for marking the signals on the record medium on the table; and means for reciprocally moving the recording head along the guide means;

said recording head including a stylus carrier of magnetic material mounted on a carriage for pivotal movement about a predetermined axis, a recording stylus mounted on the carrier for marking contact with the record medium on the table, the pivotal movement of the stylus carrier being such that the stylus is reciprocally moved transversely to the direction of movement of the recording head, means for biasing the stylus carrier in a predetermined direction about said axis, and an electromagnet mounted on the carriage in opposed relationship to the stylus carrier for causing its pivotal movement against the effect of the biasing means.

8. The recorder according to claim 7, further comprising means for lifting the stylus away from the table.

* * * * *